(12) United States Patent
Kamani et al.

(10) Patent No.: US 8,214,316 B2
(45) Date of Patent: Jul. 3, 2012

(54) NOTIFICATION-BASED FORWARD CHAINING

(75) Inventors: Kavita Kamani, Issaquah, WA (US); John Rummell, Bothell, WA (US); Donald James McCrady, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 758 days.

(21) Appl. No.: 12/409,390

(22) Filed: Mar. 23, 2009

(65) Prior Publication Data

US 2010/0241604 A1 Sep. 23, 2010

(51) Int. Cl.
*G06F 17/00* (2006.01)
*G06N 5/02* (2006.01)

(52) U.S. Cl. .......................................................... 706/48
(58) Field of Classification Search ............... 706/47–48
See application file for complete search history.

(56) References Cited

U.S. PATENT DOCUMENTS

| | | | |
|---|---|---|---|
| 5,283,856 A * | 2/1994 | Gross et al. ............. | 706/47 |
| 5,329,612 A | 7/1994 | Kakazu | |
| 5,471,629 A * | 11/1995 | Risch ............................ | 707/687 |
| 5,819,281 A | 10/1998 | Cummins | |
| 6,351,752 B1 * | 2/2002 | Cousins et al. ....................... | 1/1 |
| 6,415,275 B1 * | 7/2002 | Zahn ............................. | 706/47 |
| 6,910,070 B1 * | 6/2005 | Mishra et al. ................. | 709/224 |
| 2003/0069736 A1 | 4/2003 | Koubenski | |
| 2004/0034848 A1 | 2/2004 | Moore | |
| 2007/0112827 A1 | 5/2007 | Dettinger | |
| 2008/0071720 A1 * | 3/2008 | Willis et al. ..................... | 706/47 |
| 2008/0275829 A1 | 11/2008 | Stull | |

OTHER PUBLICATIONS

Brand, Sebastian; "Rule-Based Constraint Propagation"; pp. 1-194; Dec. 3, 2004; http://www.illc.uva.nl/Publications/Dissertations/DS-2004-02.text.pdf.
Willis, Jurgen; "Introduction to the Windows Workflow Foundation Rules Engine"; pp. 1-20; 2009; http://msdn.microsoft.com/en-us/library/aa480193.aspx.
Banks, Richard; "How to Use the Windows Workflow Rules Engine by Itself"; pp. 1-16; 2008; http://richarsbraindump.blogspot.com/2007/08/how-to-use-windows-workflow-rules.html.

* cited by examiner

*Primary Examiner* — Jeffrey A Gaffin
*Assistant Examiner* — Stanley K Hill
(74) *Attorney, Agent, or Firm* — Workman Nydegger (57) ABSTRACT

In an embodiment, a computer system determines that a first rule in a ruleset comprising a plurality of rules is to be executed, where the first rule includes a condition and an action that is to be performed when the first rule's condition is met. The computer system dynamically modifies the first rule's condition to include a portion of software code configured to monitor and receive notifications from a data-change notification system. The computer system executes the dynamically modified first rule and executes a second rule in the ruleset. The computer system receives a notification from the data-change notification system indicating that execution of the second rule's action has modified data values being monitored by the first rule's software code portion and that, as a result of the modification, the first rule is to be re-executed. The computer system also re-executes the first rule based on the received notification.

20 Claims, 4 Drawing Sheets

NOTIFICATION-BASED FORWARD CHAINING

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications may be configured to store and access large portions of data stored in databases. Such database-related software applications typically store and access the data according to rules or sets of rules. For example, a database application may be configured to receive orders for widgets produced by a company. The database may store many different types of information such as customer identification, order number, order type, number and type of widgets ordered, past orders, delivery dates and many other types of information as needed. These various portions of information are related to each other, and in some cases, one portion of information may depend on another, such that if portion "B" changes, portion "A" should also change as a result of the change to portion "B". When multiple pieces of information are dependant on one another, forward chaining is used to update the portions of information that are dependant on the portion that changed.

Typical software database applications are configured to perform forward chaining using a static analysis of conditions which cause the data portions to change.

BRIEF SUMMARY

Embodiments described herein are directed to implementing dynamic forward chaining in ruleset execution using a data-change notification system. In one embodiment, a computer system determines that a first rule in a ruleset comprising a plurality of rules is to be executed, where the first rule includes a condition and an action that is to be performed when the first rule's condition is met. The computer system dynamically modifies the first rule's condition to include a portion of software code configured to monitor and receive notifications from a data-change notification system. The notifications indicate that data values associated with the first rule's condition have changed. The computer system executes the dynamically modified first rule and executes at least a second rule in the ruleset so that at least one of the second rule's actions is performed. The computer system receives a notification from the data-change notification system indicating that execution of the second rule's action has modified data values being monitored by the first rule's software code portion and that, as a result of the modification, the first rule is to be re-executed. The computer system also re-executes the first rule based on the received notification.

In other embodiments, a computer system determines that a first rule in a ruleset that includes a plurality of rules is to be executed. The first rule includes a condition and a process that includes multiple execution paths, where the process is executed when the first rule's condition is met. The computer system dynamically modifies the first rule's condition to include a portion of software code configured to monitor data changes caused by the subsequent execution of one or more other rules, wherein data-change notifications generated by the added software code portion identify when and if the first rule is to be re-executed. The computer system executes the dynamically modified first rule and executes a second rule in the ruleset such that the second rule's multipath process is executed. The computer system receives from the data-change notification system a data-change notification indicating that, as a result of the second rule's execution, one or more portions of data being monitored by the added software code were changed. The computer system also re-executes the first rule's multipath process based on the received data-change notification.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments described herein are directed to implementing dynamic forward chaining in ruleset execution using a data-change notification system. In one embodiment, a computer system determines that a first rule in a ruleset comprising a plurality of rules is to be executed, where the first rule includes a condition and an action that is to be performed when the first rule's condition is met. The computer system dynamically modifies the first rule's condition to include a portion of software code configured to monitor and receive notifications from a data-change notification system. The notifications indicate that data values associated with the first rule's condition have changed. The computer system executes the dynamically modified first rule and executes at least a second rule in the ruleset so that at least one of the second rule's actions is performed. The computer system receives a notification from the data-change notification system indicating that execution of the second rule's action has modified data values being monitored by the first rule's software code portion and that, as a result of the modification, the first rule is to be re-executed. The computer system also re-executes the first rule based on the received notification.

In other embodiments, a computer system determines that a first rule in a ruleset that includes a plurality of rules is to be executed. The first rule includes a condition and a process that includes multiple execution paths, where the process is executed when the first rule's condition is met. The computer system dynamically modifies the first rule's condition to include a portion of software code configured to monitor data changes caused by the subsequent execution of one or more other rules, wherein data-change notifications generated by the added software code portion identify when and if the first rule is to be re-executed. The computer system executes the dynamically modified first rule and executes a second rule in the ruleset such that the second rule's multipath process is executed. The computer system receives from the data-change notification system a data-change notification indicating that, as a result of the second rule's execution, one or more portions of data being monitored by the added software code were changed. The computer system also re-executes the first rule's multipath process based on the received data-change notification.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media including recordable-type storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
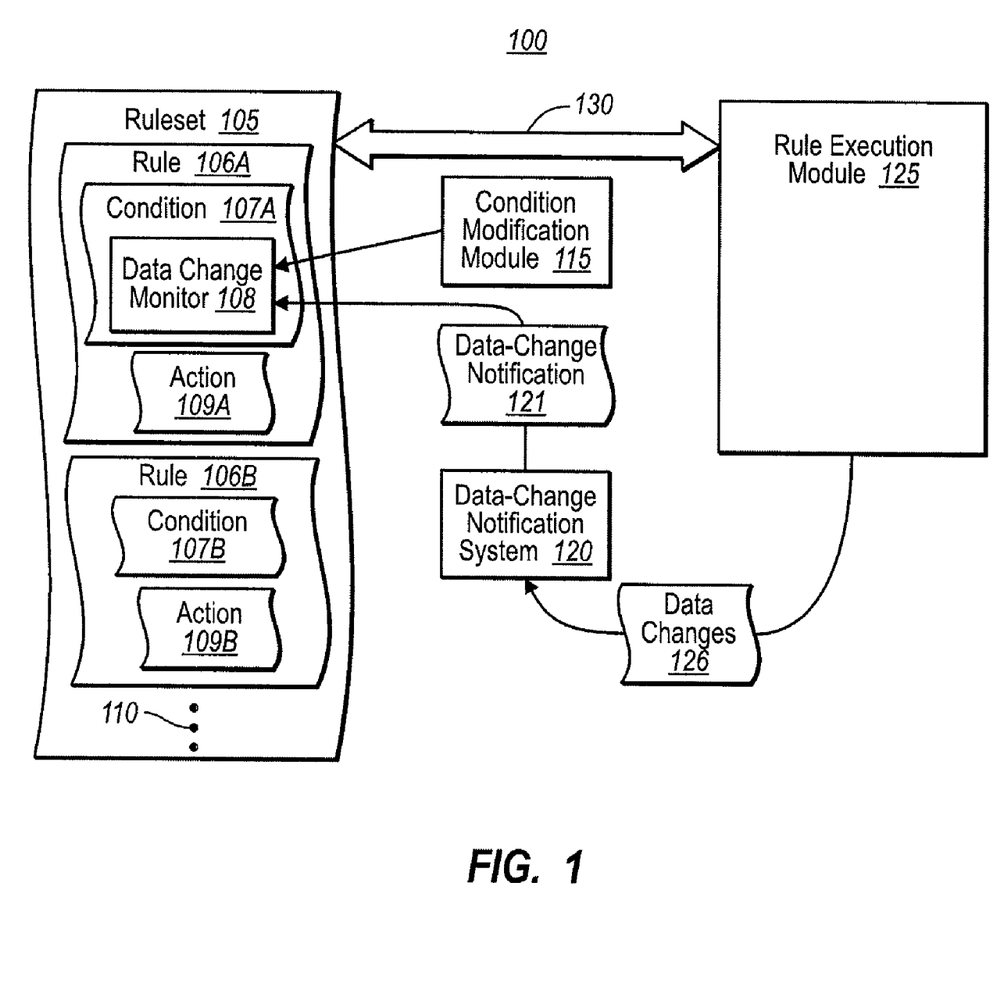
FIG. 1 illustrates a computer architecture in which embodiments of the present invention may operate including implementing dynamic forward chaining in ruleset execution using a data-change notification system.

FIG. 1 illustrates a computer architecture 100 in which the principles of the present invention may be employed. Computer architecture 100 includes ruleset 105 which may include a plurality of different rules. In some cases, a ruleset includes a single rule, and in other cases, a ruleset may include a large number of rules. Accordingly, while two rules are illustrated as being part of ruleset 105 (i.e. rules 106A and 106B, ellipses 110 are included to show that three or more rules may be included in ruleset 105. As used herein, rules include conditions, for example, condition 107A in rule 106A and condition 107B in rule 106B. Conditions include conditional statements such as "if" statements. For example, a condition 107A may be something like the following: "if (X=1)". Rules also include actions that are to be performed when the rule is met. Thus, in the example above, when the variable "X" is equal to 1, the condition is met and the corresponding action will be performed. Accordingly, when condition 107A is met, action 109A will be performed. Similarly, when condition 107B is met, action 109B will be performed.

In some cases, rules may depend on data that is dynamic and changing. For example, in a scenario where a company runs an internet web page that allows customers to place orders, the database storing the orders and customer information will be continually updated with new information such as new orders, new customers, changed orders, updated customer information, and the like. Accordingly, for conditions that include dynamically changeable variables, when those variables are changed, the condition may no longer hold true. Or, alternatively, a condition that was not previously met may be met upon a change of data. Accordingly, rule conditions may be modified by condition modification module 115 to include a data-change monitor (e.g. 108) that monitors database information for changes in data that would affect the rule's condition.

For instance, as ruleset 105 is executed by ruleset execution module 125, execution module 125 may indicate to ruleset 105 via communication channel 130 that data has changed. Rule execution module 125 may send data changes 126 to data change notification system 120. The data changes 126 may be the result of actions 109A or 109B, or may be the result of executing other actions in the ruleset. System 120 may also be configured to take the raw data changes 126 received from execution module 125 and, from that data, generate data-change notification 121 that includes those data changes that are relevant to ruleset 105.

Accordingly, dynamic forward chaining may occur as a result of the execution of ruleset 105, where any changes to data made by actions of the ruleset are relayed to the rules' conditions for a processing determination. If the condition was previously unmet and is now met (after the data change), the rule will be re-executed. Thus, as data changes in a database or other information store, the rules may be rerun to conform with the changed data. This and other concepts will be explained in greater detail below with regard to method 200 of FIG. 2.

Figure 2:
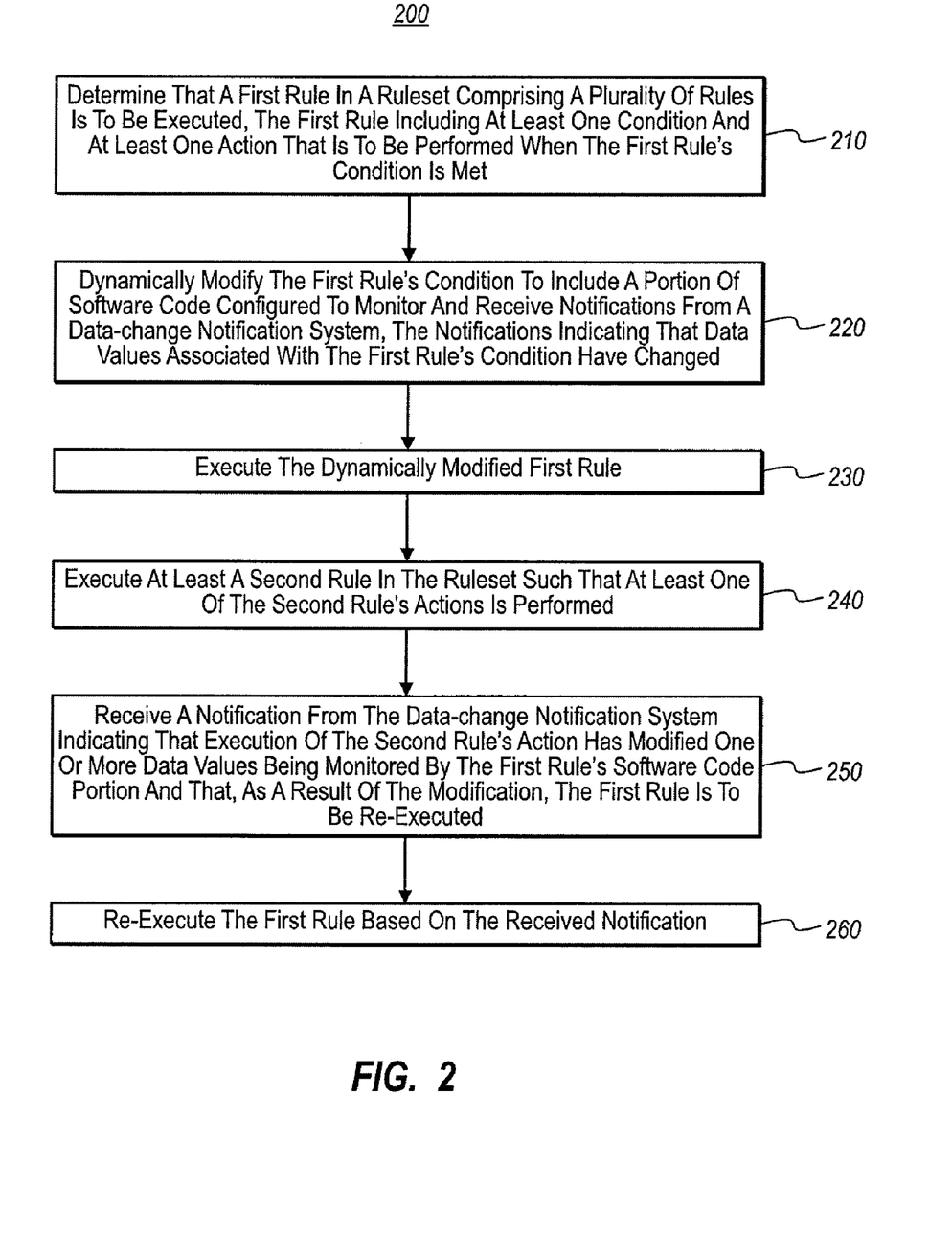
FIG. 2 illustrates a flowchart of an example method for implementing dynamic forward chaining in ruleset execution using a data-change notification system.

FIG. 2 illustrates a flowchart of a method 200 for implementing dynamic forward chaining in ruleset execution using a data-change notification system. The method 200 will now be described with frequent reference to the components and data of environment 100.

Method 200 includes an act of determining that a first rule in a ruleset comprising a plurality of rules is to be executed, the first rule including at least one condition and at least one action that is to be performed when the first rule's condition is met (act 210). For example, a computer system may determine that rule 106A in ruleset 105 is to be executed by rule execution module 125. Rule 106A includes condition 107A and action 109A that is to be performed when condition 107A is met. As explained above, rule 106A of ruleset 105 may be executed by itself or in conjunction with other rules within ruleset 105 or with rules in other rulesets. As rule actions are performed against various data sets, the data may be changed. As a result of the data change, conditions in other rules may be affected, causing them to be met or to no longer be met. Accordingly, rules may need to be re-executed based on the changed data.

Method 200 includes an act of dynamically modifying the first rule's condition to include a portion of software code configured to monitor and receive notifications from a data-change notification system, the notifications indicating that data values associated with the first rule's condition have changed (act 220). For example, condition modification module 115 may modify condition 107A to include a portion software code (e.g. data-change monitor 108) configured to monitor and receive notifications 121 from data-change notification system 120. Condition 107A may be modified dynamically, during runtime, before or after execution of the corresponding rule's action. In some cases, a condition may be automatically modified as the condition's rule is being executed to include a data-change monitor upon determining that one or more portions of data have changed, either as a result of an action being performed or simply from normal database data changes.

In some embodiments, data change monitor 108 may be configured to instantiate change notification handlers for each variable and property associated with the first rule's condition. Such change notification handlers may be configured to determine when changes have been made that would affect a variable or property associated with a rule's condition. Change notification handlers may also determine, based on data changes 126, whether a rule's variables or properties have been affected by the data change. In some cases, change notification handlers may only be instantiated for those variables and property values that are changeable during execution of a ruleset.

Data change notification 121 may include tuples, where each tuple includes an object value, a property value and a rule value. In some embodiments, upon receiving notification that a property value associated with an object has changed, those rules that are monitoring that property value may be notified that they are to be re-executed. Accordingly, only those rules whose property values have changed are re-executed. Other rules in the ruleset are not re-executed. In some cases, the addresses of the property value values are used to determine which rules were monitoring those property values. Upon determining that the rules which were monitoring the property values have been re-executed, any notifications used to inform the rule of associated changes may be removed, so that the rules ate no longer designated for re-execution.

Data-change notification system 120 may be configured to operate independent of the computer system that is executing the rules. For instance, system 120 may be provided by a remotely located server computer system configured to communicate with the components and modules of FIG. 1 via a computer network (not shown in FIG. 1). Similarly, rule execution module 125 or any other module may be provided from a remotely located server.

Method 200 includes an act of executing the dynamically modified first rule (act 230). For example, rule execution module 125 may execute dynamically modified rule 106A, potentially resulting in action 109A being performed. Action 109A may, in some cases, affect other conditions within ruleset 105 (e.g. rule 106B). In such cases, a data change notification would be sent by rule execution module 125 to data-change notification system 120, which would then notify a data-change monitor (e.g. 108) dynamically added to condition 107B.

Method 200 also includes an act of executing at least a second rule in the ruleset such that at least one of the second rule's actions is performed (act 240). For example, rule execution module 125 may execute rule 106B of ruleset 105 such that action 109B is performed. Similar to act 230 above, action 109B may, in some cases, affect other conditions within ruleset 105 (e.g. rule 106A), or within other rulesets. In such cases, a data change notification would be sent by rule execution module 125 to data-change notification system 120, which would then notify data-change monitor 108 which was dynamically added to condition 107A.

Method 200 includes an act of receiving a notification from the data-change notification system indicating that execution of the second rule's action has modified one or more data values being monitored by the first rule's software code portion and that, as a result of the modification, the first rule is to be re-executed (act 250). For example, as mentioned above, rule 106A may receive data-change notification 121 from data-change notification system 120 indicating that execution of action 109A has resulted in the modification of various data values being monitored by data change monitor 108 and that, as a result of the modification, rule 106A is to be re-executed. Accordingly, only those rules whose corresponding data has changed are to be re-executed.

In some embodiments, if a rule has a condition, an "if" statement and an "else" statement, when the condition is met and the rule is executed, either the action corresponding to the "if" statement will be performed or the action corresponding to the "else" statement will be performed. In one example, a rule's condition may include two or more sub-conditions. For instance, if the condition is "if (a=1) && (b=2)", and if the first clause of the condition is false (e.g., a≠1), then the value of "b" does not need to be monitored. This is because no matter what the value of "b", the condition won't ever be true unless the value of "a" changes. Accordingly, in such a case, when and if the value of "a" changed, the rule's condition would be re-executed. As a result, rule re-execution and even action re-performance within the rule may be monitored and controlled.

Method 200 includes an act of re-executing the first rule based on the received notification (act 260). For example, rule 106A may be re-executed after receiving data-change notification 121. In some embodiments, the rules of ruleset 105 may be configured to execute against a collection of items. For instance, it may be determined, after at least one of the rules of the ruleset has been executed, that one or more items in the collection of items has been modified. In such cases, only those rules of the ruleset whose conditions were affected by the modification of the one or more items of the collection of items will be re-executed. In other cases, it may be determined, after at least one of the rules of the ruleset has been executed, that one or more items has been added to the collection of items. In such cases, only those rules of the ruleset whose conditions were affected by the addition of the one or more items to the collection of items will be re-executed.

For example, a collection of orders may include multiple different orders. A rule regarding the collection of orders may exist with a condition stating that if the order has an amount of 10 items or more, all items in that order are to be discounted by 20%. If the order has an amount of more than 10 items and is later modified to include less than 10 items, or if the order has less than 10 items and new items are added such that the order now includes at least 10 items, the condition will change from being unmet to being met (or vice versa). Accordingly, as items (or amounts of items) in an order change, a rule's condition regarding a corresponding order may change from being met or unmet. Thus, as explained above, the collection of orders may be monitored such that when an order (or any item of an order) is added, removed, or modified in some fashion, the corresponding rule may be re-executed to ensure that the proper action is performed in regard to the collection of orders (e.g. applying the discount if the order amount is greater than 10 in the above example). In this manner, one may ensure that rules applied to a collection are properly applied, even when the collection is modified and the condition's state (met/unmet) regarding the collection has changed.

Figure 3:
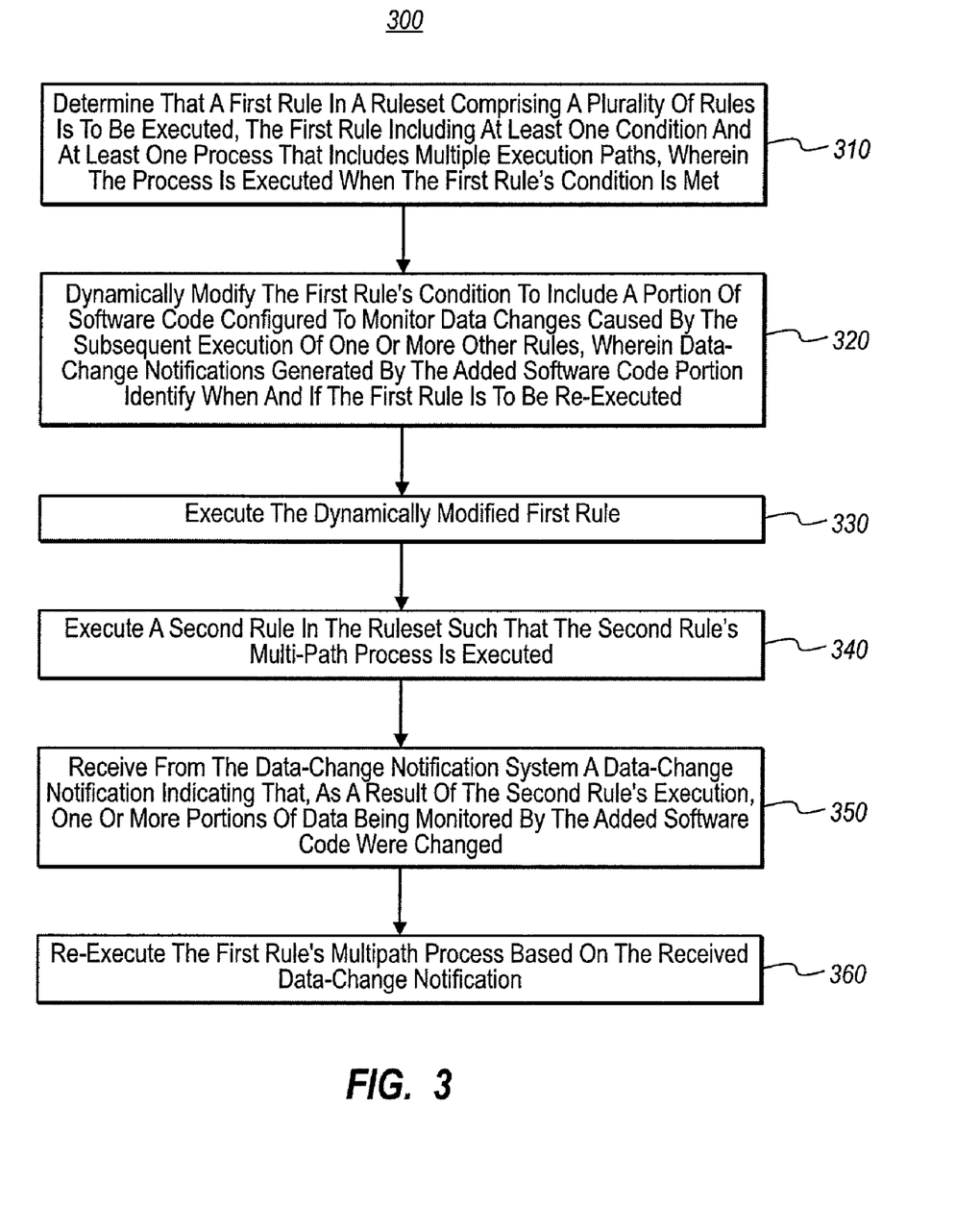
FIG. 3 illustrates a flowchart of an alternative example method for implementing dynamic forward chaining in ruleset execution using a data-change notification system.

FIG. 3 illustrates a flowchart of a method 300 for implementing dynamic forward chaining in ruleset execution using a data-change notification system. The method 300 will now be described with frequent reference to the components and data of environment 100 of FIG. 1 and Ruleset 1 of FIG. 4.

Method 300 includes an act of determining that a first rule in a ruleset comprising a plurality of rules is to be executed, the first rule including at least one condition and at least one process that includes multiple execution paths, wherein the process is executed when the first rule's condition is met (act 310). For example, rule execution module 125 may determine that rule 1A (406A) of ruleset 1 (405) comprising rules 1A and 1B (406B) is to be executed. Rule 1A includes a condition (407A) and a process with multiple execution paths (408A and 409A). This process may be executed when rule 1A's condition 407A is met. Thus, in the example embodiment shown in FIG. 4, rule 1A's condition 407A is "a=1", and as the comments indicate, condition 407A watches for and is met when a variable "a" is equal to "1". In some cases, a multipath process may include a workflow. Accordingly, when condition 407A is met, a workflow may be initiated which may have multiple execution paths.

Figure 4:
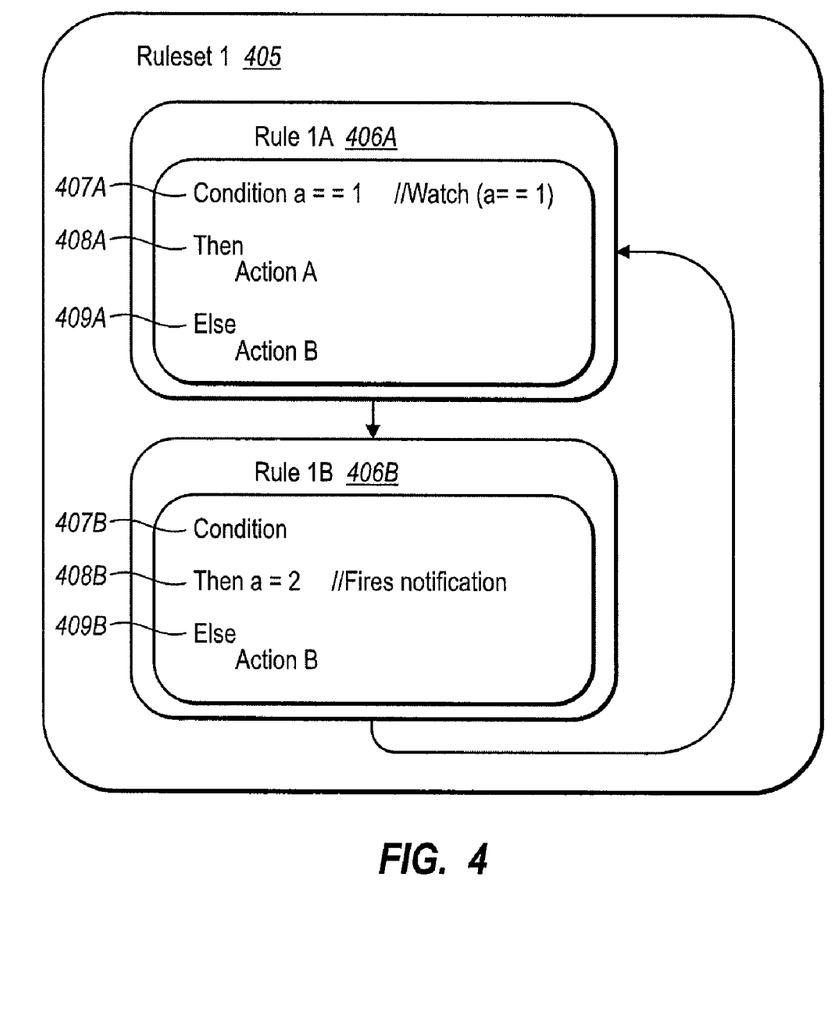
FIG. 4 illustrates an embodiment of a ruleset comprising multiple rules.

Method 300 includes an act of dynamically modifying the first rule's condition to include a portion of software code configured to monitor data changes caused by the subsequent execution of one or more other rules, wherein data-change notifications generated by the added software code portion identify when and if the first rule is to be re-executed (act 320). For example, condition modification module 115 may dynamically modify rule 1A's condition to include data change monitor 108 which is configured to monitor data changes caused by the subsequent execution of rules 110, where data-change notifications generated by data change monitor 108 identify when and if rule 106A is to be re-executed. Accordingly, as illustrated in FIG. 4, when condition 407A is met, the "Then" action, "Action A" may be performed or the "Else" action, "Action B" may be performed. Actions A and B may be any type of software function, algorithm or other portion of code configured to perform some type of work or bring about some action as defined by the code or operations called from within the code. As mentioned above, the processing of Actions A and B may result in the changing of variables which may be part of other rules' conditions. As a result, those rules may need to be re-executed.

Method 300 includes an act of executing the dynamically modified first rule (act 330). For example, rule execution module 125 may execute dynamically modified rule 1A, possibly resulting in rule 1A's multipath process being executed. When the multipath process is executed, the actual path that is ultimately executed may be monitored and the corresponding information identifying the executed path may be stored in an information store which is accessible by rule execution module 125.

Method 300 includes an act of executing a second rule in the ruleset such that the second rule's multipath process is executed (act 340). For example, rule execution module 125 may execute dynamically modified rule 1B (406B) such that rule 1B's multipath process is executed. Thus, although a condition is not shown in FIG. 4, it is assumed that, whatever condition exists, is met and that rule 1B's multipath process is to be executed. It should be noted that, as in rule 1A, rule 1B may have any type of condition and that condition may include any number of variables which may or may not be affected by the execution of other rules in ruleset 1 or in other rulesets.

Method 300 includes an act of receiving from the data-change notification system a data-change notification indicating that, as a result of the second rule's execution, one or more portions of data being monitored by the added software code were changed (act 350). For example, data change monitor 108 may receive from data-change notification system 120 a notification 121 that, as a result of rule 1B's execution, at least one portion of data being monitored by data change monitor 108 was changed. It should be noted that, in cases where a condition does not represent a true dependency (e.g. a given portion of the condition is always true and the condition involves an OR statement, or a given portion of the condition is always false and the condition involves an AND statement, etc.), because the outcome of the condition is known, the dynamic installation of a data change monitor 108 may be avoided. This may, in turn, lead to more efficient rule processing.

In another example relating to the execution of rule 1B, rule execution module 125 may determine that execution of rule 1B's "Then" action (a=2) (408B) has modified a data value (variable "a") that is being monitored by rule 1A's data change monitor 108. In some embodiments, data change monitor 108 may determine that the variable "a" has changed and may indicate to rule execution module 125 via communication path 130 that a watched variable has changed. Additionally or alternatively, the data change monitor 108 that was dynamically added to rule 1B may, as indicated by the comment "//Fires notification" send an indication to rule execution module 125 that a variable value has been changed and that, if that variable is part of another rule's condition, that rule may need to be re-executed.

Method 300 also includes an act of re-executing the first rule's multipath process based on the received data-change notification (act 360). For example, as indicated by the arrow in FIG. 4 going from rule 1B to rule 1A, rule execution module 125 may re-execute rule 1A's multipath process based on the received data-change notification 121. In cases where the rules (406A and 406B) of ruleset 1 (405) are configured to execute against a collection of items, rule execution module 125 may determine, after at least one of the rules of the ruleset has been executed, that one or more items in the collection of items has been modified. In such cases, only those rules of the ruleset whose conditions were affected by the modification of the one or more items of the collection of items are re-executed. Accordingly, in a ruleset governing orders received from a customer, if one or more portions of a given order are changed (e.g. customer address, number or type of widget ordered, etc.), those rules that whose conditions were affected by the customer address change or number/type of widget ordered change will be re-executed. Thus, in cases where, for example, a discount applies to orders over a certain number, and the order change raises the number ordered to a number over that limit, the rule governing discounts is re-executed and the discount is applied.

It should be understood that the above is only one example of many different scenarios where forward chaining using a data-change notification system may be useful. It should also be understood that the example illustrated in FIG. 4 is simplistic in nature and that, in practice, a ruleset may include many more rules and that each rule in a ruleset may be affected by data changes enacted by execution of other rulesets. Accordingly, systems, methods and computer program products are herein described that describe how dynamic forward chaining may be implemented in ruleset execution using a data-change notification system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including a processor and a memory, in a computer networking environment including a plurality of computing systems, a computer-implemented method for implementing dynamic forward chaining in ruleset execution using a data-change notification system, the method comprising:
   an act of determining that a first rule in a ruleset comprising a plurality of rules is to be executed, the first rule including at least one condition and at least one action that is to be performed when the first rule's condition is met;
   an act of dynamically modifying the first rule's condition to include a portion of software code configured to monitor and receive notifications from a data-change notification system, the notifications indicating that data values associated with the first rule's condition have changed;
   an act of executing the dynamically modified first rule;
   an act of executing at least a second rule in the ruleset such that at least one of the second rule's actions is performed;
   an act of receiving a notification from the data-change notification system indicating that execution of the second rule's action has modified one or more data values being monitored by the first rule's software code portion and that, as a result of the modification, the first rule is to be re-executed; and
   an act of re-executing the first rule based on the received notification.

2. The method of claim 1, wherein the portion of software code is configured to instantiate change notification handlers for each variable and property associated with the first rule's condition.

3. The method of claim 1, wherein the first rule's condition is dynamically modified at runtime.

4. The method of claim 1, wherein the rules of the ruleset are configured to execute against a collection of items.

5. The method of claim 4, further comprising an act of determining, after at least one of the rules of the ruleset has been executed, that one or more items in the collection of items has been modified.

6. The method of claim 4, further comprising an act of determining, after at least one of the rules of the ruleset has been executed, that one or more items has been added to the collection of items.

7. The method of claim 5, further comprising an act of re-executing only those rules of the ruleset whose conditions were affected by the modification of the one or more items of the collection of items.

8. The method of claim 6, further comprising an act of re-executing only those rules of the ruleset whose conditions were affected by the addition of the one or more items to the collection of items.

9. The method of claim 2, wherein change notification handlers are only instantiated for those variables and property values that are changeable during execution of the ruleset.

10. The method of claim 1, wherein the notifications comprise tuples, each tuple including an object value, a property value and a rule value.

11. The method of claim 10, further comprising, upon receiving notification that a property value associated with an object has changed, an act of notifying those rules that are monitoring that property value that they are to be re-executed.

12. The method of claim 11, wherein the addresses of the property value values are used to determine which rules were monitoring those property values.

13. The method of claim 11, further comprising:
   an act of determining that the rules which were monitoring the property values have been re-executed; and
   an act of removing the notifications, such that the rules are no longer designated for re-execution.

14. A computer program product for implementing a method for implementing dynamic forward chaining in ruleset execution using a data-change notification system, the computer program product comprising one or more computer-readable storage media having stored thereon computer-executable instructions that, when executed by one or more processors of the computing system, cause the computing system to perform the method, the method comprising:
   an act of determining that a first rule in a ruleset comprising a plurality of rules is to be executed, the first rule including at least one condition and at least one process that includes multiple execution paths, wherein the process is executed when the first rule's condition is met;

an act of dynamically modifying the first rule's condition to include a portion of software code configured to monitor data changes caused by the subsequent execution of one or more other rules, wherein data-change notifications generated by the added software code portion identify when and if the first rule is to be re-executed;

an act of executing the dynamically modified first rule;

an act of executing a second rule in the ruleset such that the second rule's multipath process is executed;

an act of receiving from the data-change notification system a data-change notification indicating that, as a result of the second rule's execution, one or more portions of data being monitored by the added software code were changed; and an act of re-executing the first rule's multipath process based on the received data-change notification.

15. The computer program product of claim 14, wherein the multipath process comprises a workflow.

16. The computer program product of claim 14, wherein the rules of the ruleset are configured to execute against a collection of items.

17. The computer program product of claim 16, further comprising an act of determining, after at least one of the rules of the ruleset has been executed, that one or more items in the collection of items has been modified.

18. The computer program product of claim 17, further comprising an act of re-executing only those rules of the ruleset whose conditions were affected by the modification of the one or more items of the collection of items.

19. A computer system comprising the following:
one or more processors;
system memory;
one or more computer-readable storage media having stored thereon computer-executable instructions that, when executed by the one or more processors, causes the computing system to perform a method for implementing dynamic forward chaining in ruleset execution using a data-change notification system, the method comprising the following:

an act of determining that a first rule in a ruleset comprising a plurality of rules is to be executed, the first rule including at least one condition and at least one action that is to be performed when the first rule's condition is met;

an act of dynamically modifying the first rule's condition to include a portion of software code configured to monitor and receive notifications from a data-change notification system, the notifications indicating that data values associated with the first rule's condition have changed;

an act of executing the dynamically modified first rule;

an act of executing at least a second rule in the ruleset such that at least one of the second rule's actions is performed;

an act of receiving a notification from the data-change notification system indicating that execution of the second rule's action has modified one or more data values being monitored by the first rule's software code portion and that, as a result of the modification, the first rule is to be re-executed; and an act of re-executing the first rule based on the received notification.

20. The computer system of claim 19, wherein the data-change notification system is configured to operate independent of the computer system and is provided by a remotely located server computer system.

* * * * *